US012574489B1

(12) United States Patent
Cantero Clares

(10) Patent No.: US 12,574,489 B1
(45) Date of Patent: Mar. 10, 2026

(54) STEREOSCOPIC IMAGE DISPLAY SYSTEM AND STEREOSCOPIC IMAGE GENERATION METHOD THEREOF

(71) Applicant: Acer Incorporated, New Taipei City (TW)

(72) Inventor: Sergio Cantero Clares, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 0 days.

(21) Appl. No.: 18/945,590

(22) Filed: Nov. 13, 2024

(51) Int. Cl.
H04N 13/271 (2018.01)
G06V 20/40 (2022.01)
H04N 13/00 (2018.01)

(52) U.S. Cl.
CPC ........... H04N 13/271 (2018.05); G06V 20/46 (2022.01); *H04N 2013/0081* (2013.01)

(58) Field of Classification Search
CPC ........... H04N 13/344; H04N 2213/002; H04N 13/363; H04N 2213/008; H04N 2213/001; H04N 9/14; H04N 13/305; H04N 13/341; H04N 9/315
USPC .......................................................... 348/51
See application file for complete search history.

(56) References Cited

U.S. PATENT DOCUMENTS

| | | | |
|---|---|---|---|
| 10,515,275 B2 | 12/2019 | Lu | |
| 2012/0327197 A1* | 12/2012 | Yamashita | ............. G06T 7/593 |
| | | | 348/E13.074 |
| 2018/0182178 A1* | 6/2018 | Varanasi | ............. H04N 13/246 |
| 2024/0223739 A1* | 7/2024 | Xiong | ................... G06T 19/006 |

FOREIGN PATENT DOCUMENTS

| | | | | |
|---|---|---|---|---|
| CN | 114723883 | 7/2022 | | |
| TW | 201303793 | 1/2013 | | |
| TW | M458748 | 8/2013 | | |
| TW | 201509360 | 3/2015 | | |
| WO | WO-2014027229 A1 * | 2/2014 | ......... | A61B 1/00194 |

\* cited by examiner

*Primary Examiner* — Masum Billah
(74) *Attorney, Agent, or Firm* — JCIPRNET

(57) ABSTRACT

A stereoscopic image display system and a stereoscopic image generation method thereof are disclosed. The method includes the following steps. An input frame and depth information of the input frame are obtained. A scene type of the input frame is recognized. A projection parameter of a camera projection processing is determined according to the scene type of the input frame. A plurality of pixels in the input frame are projected to a stereoscopic coordinate system to obtain a plurality of scene stereoscopic coordinates in the stereoscopic coordinate system according to the projection parameter and the depth information. A side-by-side image including a left-eye image and a right-eye image is generated according to the plurality of scene stereoscopic coordinates.

10 Claims, 7 Drawing Sheets

111 112

110

Right eye
Left eye

STEREOSCOPIC IMAGE DISPLAY SYSTEM AND STEREOSCOPIC IMAGE GENERATION METHOD THEREOF

BACKGROUND

Technical Field

The disclosure relates to an image processing technology, and particularly relates to a stereoscopic image display system and a stereoscopic image generation method thereof.

Description of Related Art

With the advancement of display technology, stereoscopic displays that support stereoscopic vision technology have gradually become popular. Stereoscopic vision technology allows the viewer to feel the three-dimensionality of images, such as the three-dimensional facial features and depth of field of characters, etc. However, traditional 2D images may not demonstrate such an effect. The principle of stereoscopic vision technology is to let the viewer's left eye view the left-eye image and let the viewer's right eye view the right-eye image, so that the viewer may experience the 3D visual effect. The 3D display may respectively provide left-eye images and right-eye images to the left eye and right eye of the viewer, so as to provide a visually immersive experience to the viewer. However, the 3D image content currently on the market is insufficient. Therefore, even if the user has the 3D display, the user still may not fully and arbitrarily enjoy the display effects brought by the 3D display. At present, although there is technology to generate 3D content for monocular image content, the problem of image edge blurring is often prone to occur, and the depth perception range of virtual scenes is fixed and limited.

SUMMARY

The disclosure provides a stereoscopic image display system and a stereoscopic image generation method that may effectively solve the above problems.

An exemplary embodiment of the disclosure provides a stereoscopic image generation method, which is adapted for a stereoscopic image display system including a stereoscopic display and includes the following steps. An input frame and depth information of the input frame are obtained. A scene type of the input frame is recognized. A projection parameter of a camera projection processing is determined according to the scene type of the input frame. A plurality of pixels in the input frame are projected to a stereoscopic coordinate system to obtain a plurality of scene stereoscopic coordinates in the stereoscopic coordinate system according to the projection parameter and the depth information. A side-by-side image including a left-eye image and a right-eye image is generated according to the plurality of scene stereoscopic coordinates.

Another exemplary embodiment of the disclosure provides a stereoscopic image display system, which includes a stereoscopic display and at least one processor. The processor is coupled to the stereoscopic display and is configured to perform the following operations. An input frame and depth information of the input frame are obtained. A scene type of the input frame is recognized. A projection parameter of a camera projection processing is determined according to the scene type of the input frame. A plurality of pixels in the input frame are projected to a stereoscopic coordinate system to obtain a plurality of scene stereoscopic coordinates in the stereoscopic coordinate system according to the projection parameter and the depth information. A side-by-side image including a left-eye image and a right-eye image is generated according to the plurality of scene stereoscopic coordinates.

Based on the above, in the embodiment of the disclosure, the projection parameter of the camera projection processing may be determined according to the scene type of the input frame, and the plurality of pixels in the input frame are respectively projected to the plurality of scene stereoscopic coordinates in the stereoscopic coordinate system according to the projection parameter. Therefore, the side-by-side image including the left-eye image and the right-eye image may be generated based on the scene stereoscopic coordinates. Based on this, it not only allows users to perceive the depth of field that matches the scene type, but also improves the image quality of 3D content.

DESCRIPTION OF THE EMBODIMENTS

Figure 1:
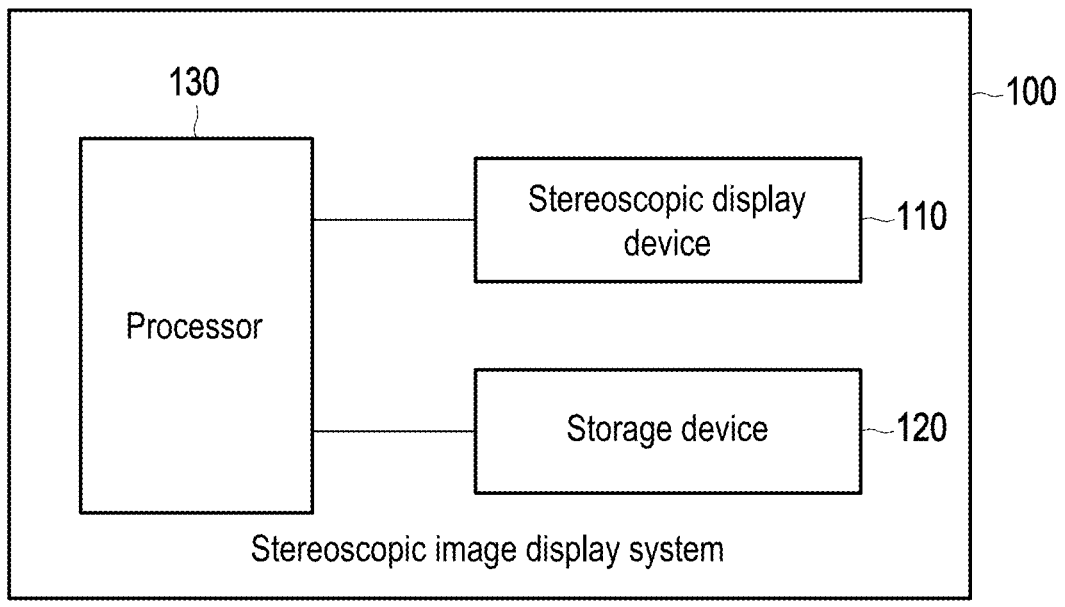
FIG. 1 is a schematic diagram of a stereoscopic image display system according to an embodiment of the disclosure.

Some of the exemplary embodiments of the disclosure will be described in detail with the accompanying drawings. The reference numerals used in the following description will be regarded as the same or similar components when the same reference numerals appear in different drawings. These exemplary embodiments are only a part of the disclosure, and do not disclose all of the ways in which this disclosure can be implemented. More specifically, these exemplary embodiments are only examples of the method and the system in the claims of the disclosure.

FIG. 1 is a schematic diagram of a stereoscopic image display system according to an embodiment of the disclosure. Referring to FIG. 1, a stereoscopic image display system 100 may include a stereoscopic display 110, a storage device 120, and at least one processor 130. In different embodiments, the stereoscopic image display system 100 may be implemented as an integrated system or a separate system. In some embodiments, the stereoscopic display 110, the storage device 120, and the processor 130 may be implemented in an all-in-one electronic device, such as a notebook computer, a tablet computer, a desktop computer, a game console, and a portable electronic device, or other personal electronic devices. Alternatively, in some embodiments, the stereoscopic display 110 may be connected to a computer device including the storage device 120 and the processor 130 via a wired or wireless transmission interface. The stereoscopic display 110 allows the user to experience a stereoscopic visual effect.

In order to allow the user to experience the 3D visual effect through the stereoscopic display 110, the stereoscopic display 110 may allow the user's left eye and right eye to view image content (that is, the left-eye image and the right-eye image) corresponding to different viewing angles according to its hardware specifications and the 3D display technology applied thereto.

In some embodiments, the stereoscopic display 110 may be a naked-eye 3D display, which may be implemented as a laptop monitor, a television, a desktop screen, an electronic signage, etc. In some embodiments, the left-eye image and the right-eye image may be displayed simultaneously based on stereoscopic image display technology, such as parallax barrier technology, lens technology, or directional backlight technology. Alternatively, in some embodiments, the stereoscopic display 110 may be a head-mounted display device, such as a virtual reality display device or a mixed reality display device, etc.

On the other hand, the stereoscopic display 110 may include a liquid crystal display (LCD), a light-emitting diode (LED) display, an organic light-emitting diode display (OLED), or other types of displays, and the disclosure is not limited thereto.

The storage device 120 is used for temporarily or permanently storing data, such as images, instructions, program codes, software modules, etc. Specifically, the storage device 120 may include a volatile storage circuit. The volatile storage circuit is used for storing data in a volatile manner. For example, the volatile storage circuit may include random access memory (RAM) or similar volatile storage media. Alternatively, the storage device 120 may include a non-volatile storage circuit. The non-volatile storage circuit is used for storing data in a non-volatile manner. For example, the non-volatile storage circuit may include a read only memory (ROM), a solid state drive (SSD), and/or a traditional hard disk drive (HDD) or similar non-volatile storage media. The number of storage devices 120 may be one or more, and the disclosure does not limit this.

The processor 130 is connected to the stereoscopic display 110 and the storage device 120. For example, the processor 130 may include a central processing unit (CPU), a graphics processing unit (GPU) or other programmable general-purpose or special-purpose microprocessors, a digital signal processor (DSP), a programmable controller, an application specific integrated circuit (ASIC), a programmable logic device (PLD), or other similar devices, or a combination thereof. The number of processors 130 may be one or more, and the disclosure does not limit this.

Figure 2:
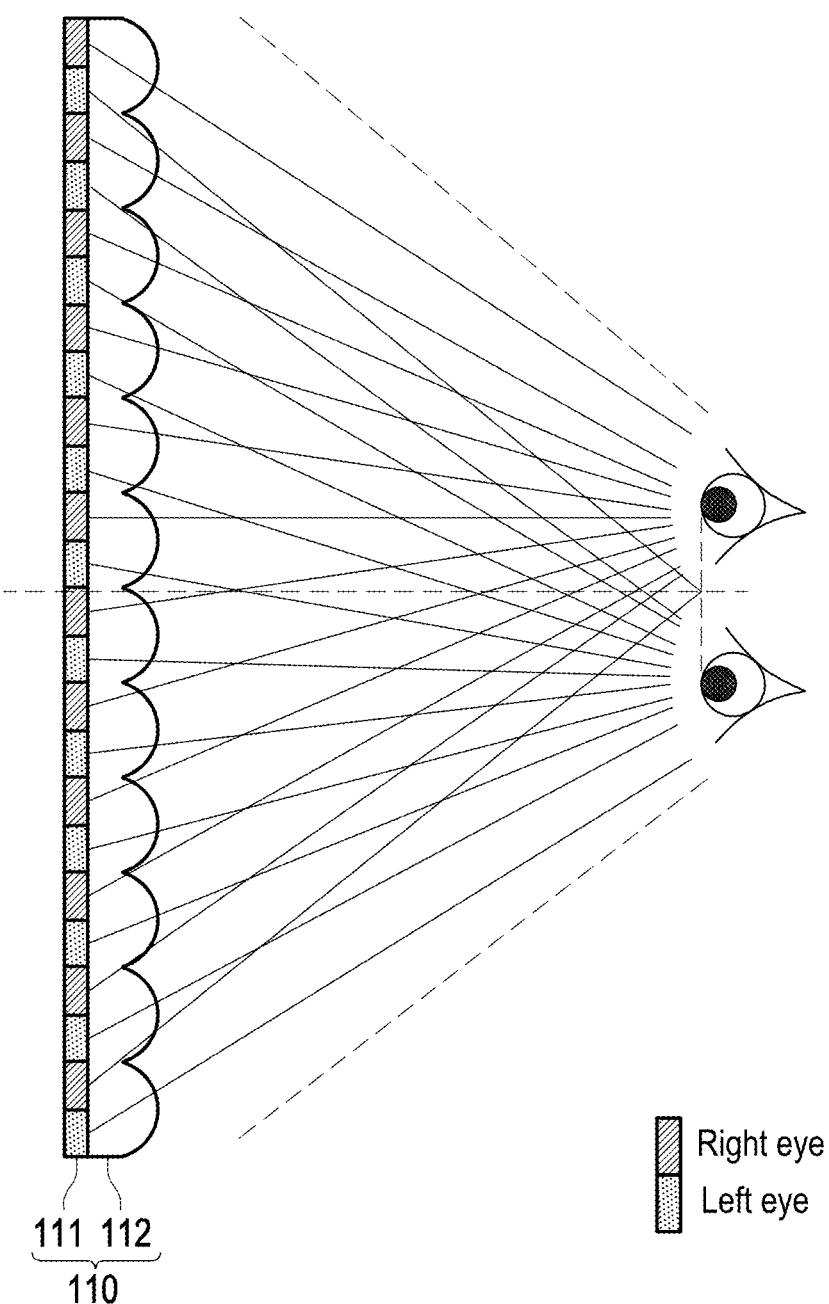
FIG. 2 is a schematic diagram of a stereoscopic display according to an embodiment of the disclosure.

FIG. 2 is a schematic diagram of a stereoscopic display according to an embodiment of the disclosure. Referring to FIG. 2, in some embodiments, the stereoscopic display 110 may be a naked-eye stereoscopic display, which may provide different images for the left eye and the right eye through the lens refraction principle, so that the viewer may experience the stereoscopic display effect. The stereoscopic display 110 may include a display panel 111 and a lens layer 112. The lens layer 112 is disposed above the display panel 111, and the viewer may see the image content provided by the display panel 111 through the lens layer 112. The stereoscopic display 110 may respectively place the pixels of the first left-eye image and the pixels of the first right-eye image at corresponding pixel positions of the display panel 111. The lens layer 112 refracts different display contents (i.e., the left-eye image and the right-eye image) to different positions in space through the refraction of light, so that the left eye and the right eye may respectively receive two different images with parallax. It can be seen that in order to place the pixels of the left-eye image and the pixels of the right-eye image at the corresponding pixel positions on the display panel 111, the left-eye image and the right-eye image need to undergo image weaving processing, so as to generate a weaving frame in which the pixels of the left-eye image and the pixels of the right-eye image are alternately arranged.

Figure 3:
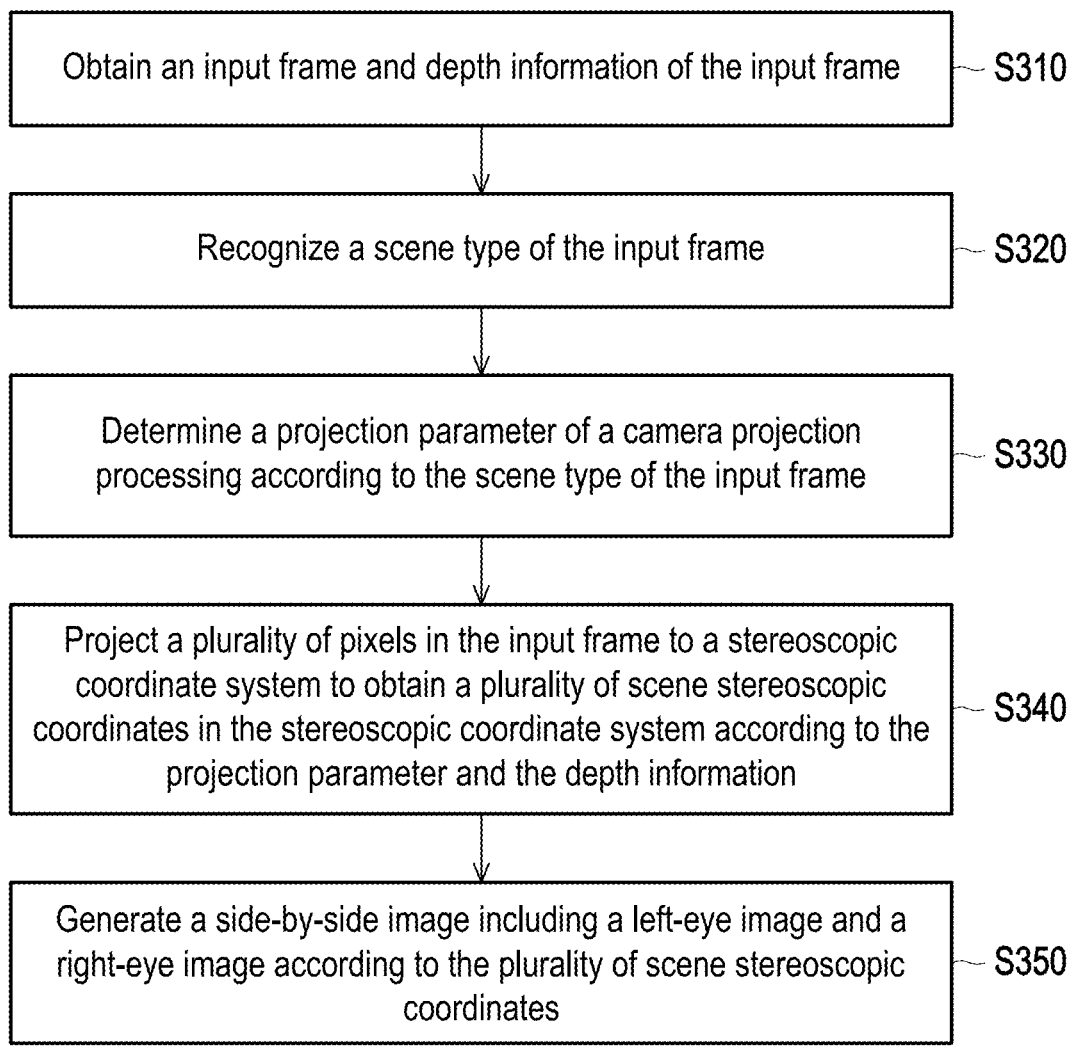
FIG. 3 is a flowchart of a stereoscopic image generation method according to an embodiment of the disclosure.

FIG. 3 is a flowchart of a stereoscopic image generation method according to an embodiment of the disclosure. Referring to FIG. 3, the operation flow of the embodiment is applicable to the stereoscopic image display system 100 in the above embodiment. The detailed steps of the embodiment will be described below with various components in the stereoscopic image display system 100.

In step S310, the processor 130 obtains an input frame and depth information of the input frame. The input frame is a two-dimensional image. In some embodiments, the processor 130 may use a screenshot function to obtain the input frame. In some embodiments, the processor 130 may retrieve the input frame through an application programming interface (API) provided by the operating system. For example, the processor 130 may use a screen capture technology such as "Desktop Duplication API" or "DirectX Graphics Infrastructure (DXGI)" of the Windows operating system to obtain the input frame, but the disclosure is not limited thereto.

In some embodiments, the input frame may be a streaming image in a video stream. In some embodiments, the streaming image may originate from a video stream of a video conferencing program, a multimedia player program, or a browser program. For example, when the processor 130 executes a video conferencing software, the processor 130 may receive streaming images provided by conference participants through the transceiver. Alternatively, when the processor 130 executes a multimedia player program to play a video including a plurality of 2D images, the processor 130 may obtain one or more 2D images in the video as input frames.

In some embodiments, the processor 130 may perform monocular depth estimation on the input frame to obtain the depth information of the input frame. By performing monocular depth estimation, the processor 130 may estimate depth information of the input frame based on the input frame from a single perspective. The depth information of the input frame may include a depth map or point cloud, etc. In some embodiments, the processor 130 may use a deep learning model to perform monocular depth estimation on the input frame. The processor 130 may input the input frame into the trained monocular depth estimation model to obtain the depth map of the input frame. Alternatively, in some embodiments, the processor 130 may use other conventional vision algorithms to perform monocular depth estimation on the input frame. For example, the processor 130 may analyze parallax information in the input frame, image features at different scales, or motion trajectories of objects, etc., so as to estimate the depth information of the input frame. It should be noted that the depth value in the depth information obtained according to the monocular depth estimation has been normalized and falls within a preset value range. For example, the depth value in the depth map may range from 0 to 255.

In step S320, the processor 130 may recognize the scene type of the input frame. The processor 130 may use various image scene recognition technologies to determine the scene type of the input frame. That is to say, the processor 130 will analyze the scene content of the input frame and classify the input frame into one of a plurality of candidate scene types. The candidate scene types may be designed according to actual applications, such as indoor scene types, outdoor scene types, character close-up types, distant view scene types, or close view scene types. The processor 130 may determine the scene type of the input frame by analyzing the image features in the input frame. For example, when the processor 130 determines that an input frame includes a face object larger than a specific size, the processor 130 may determine that the scene type of the input frame is a character close-up type.

In some embodiments, the processor 130 may input the input frame to an image classification model. The processor 130 may determine the scene type of the input frame according to the classification result of the image classification model. The image classification model may be a trained convolution neural network model. In different embodiments, the image classification model is, for example, LeNet, AlexNet, VGG, GoogLeNet (Inception), ResNet, DenseNet, etc. used for image classification tasks in the convolution neural network (CNN) model, and the disclosure does not limit the network architecture used by the image classification model.

Figure 4:
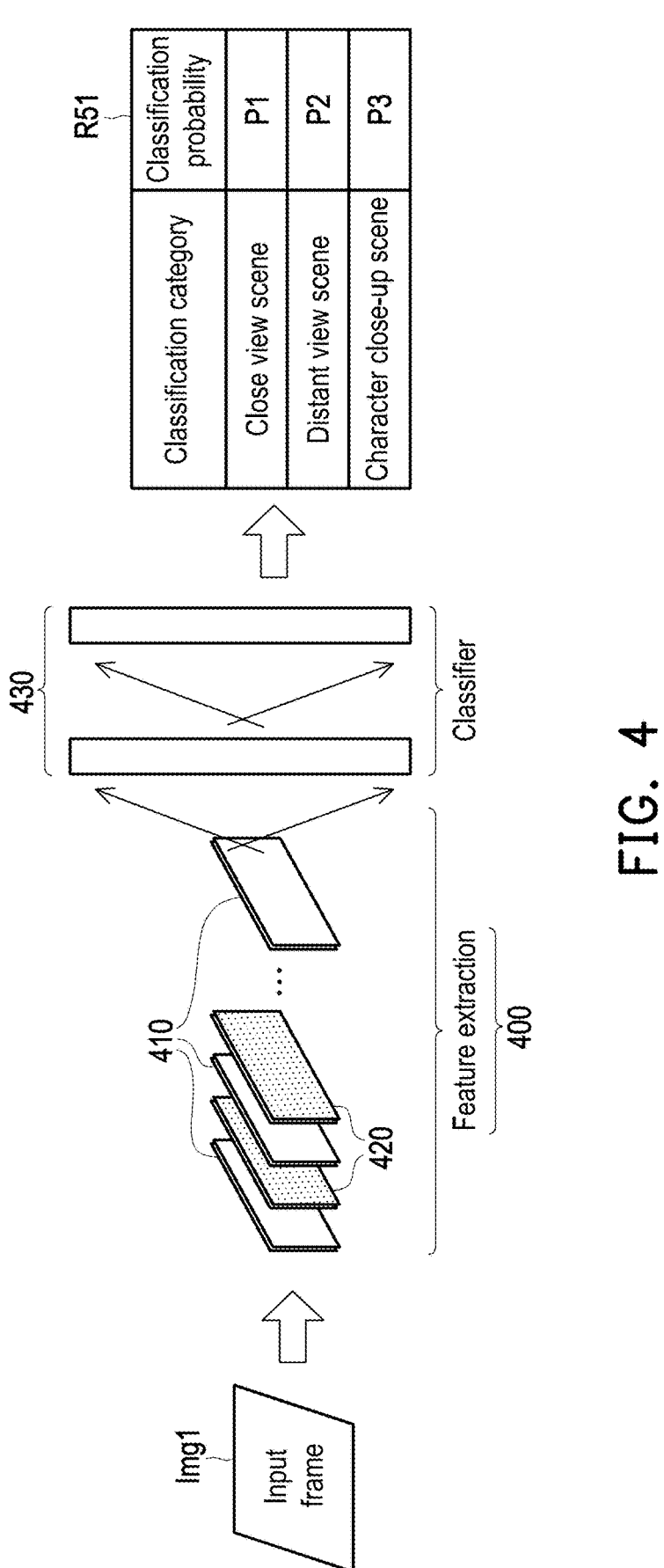
FIG. 4 is a schematic diagram of recognizing a scene type according to an embodiment of the disclosure.

For example, FIG. 4 is a schematic diagram of recognizing a scene type according to an embodiment of the disclosure. An image classification model 400 is composed of at least one convolution layer 410, at least one pooling layer 420, and at least one fully connected layer 430. The front end of the image classification model 400 usually consists of the convolution layer 410 and the pooling layer 420 connected in series, and is usually used as image feature extraction to obtain the feature vector of an input frame Img1. However, it should be noted that in another embodiment, the convolution layer 410 and the pooling layer 420 may also be combined in series and in parallel. The disclosure is not intended to limit the combination or arrangement of the convolution layer 410 and the pooling layer 420.

The back end of the image classification model 400 includes the fully connected layer 430. The fully connected layer 430 will classify the input frame Img1 according to the feature vector generated through the convolution layer 410 and the pooling layer 420, and generate a classification result R51. The classification result R51 generated by the image classification model 400 includes the classification probability of classifying the input frame Img1 into various classification categories (the plurality of candidate scene types). The processor 140 may determine that the scene type of the input frame Img1 is a candidate scene type corresponding to the maximum classification probability. For example, if a classification probability P1 of the classification category is the maximum value, it means that the image classification model 400 classifies the input frame Img1 as a "close view scene", so the processor 130 may determine the scene type of the input frame Img1 as a "close view scene".

In step S330, the processor 130 may determine the projection parameter of the camera projection processing according to the scene type of the input frame. In different embodiments, the projection parameter of the camera projection processing includes a camera intrinsic parameter, a scene depth range, or a combination thereof. In the embodiment of the disclosure, the camera projection processing is back-projection based on the pinhole camera model, which may back-project the pixels in the input frame to a coordinate point in the stereoscopic space coordinate system. Specifically, based on the back-projection principle of the pinhole camera model, the processor 130 needs the camera intrinsic parameter and the depth information of the pixels to project the pixels in the input frame to the stereoscopic space coordinate system. The camera intrinsic parameter may be a camera intrinsic parameter matrix, and may include focal length information and principle point positions in the x-axis and y-axis directions on the image plane.

It should be noted that in some embodiments, the processor 130 may adjust the normalized depth information of the pixels according to the scene depth range, and then calculate the stereoscopic space coordinates corresponding to the pixels according to the adjusted depth information and the camera intrinsic parameter. The scene depth range is between the near plane scene depth and the far plane scene depth. That is to say, since the processor 130 may determine the scene depth range of the camera projection processing according to the scene type of the input frame, the processor 130 may generate actual depth information that is closer to the actual scene situation according to the scene type of the input frame.

In some embodiments, when the scene type of the input frame is the first scene type, the processor 130 may determine the projection parameter of the camera projection processing to be the first value corresponding to the first scene type. When the scene type of the input frame is the second scene type, the processor 130 may determine the projection parameter of the camera projection processing to be a second value corresponding to the second scene type.

The first value is different from the second value. In some embodiments, the processor 130 may determine the projection parameter corresponding to different scene types by looking up a table. That is to say, the projection parameter of the camera projection processing may change as the scenes of a plurality of input frames change.

In some embodiments, the first scene type is a distant view type, and the second scene type is a close view type. The projection parameter of the camera projection processing may include a near plane scene depth and a far plane scene depth. The near plane scene depth corresponding to the distant view type is greater than the near plane scene depth corresponding to the close view type. The far plane scene depth corresponding to the distant view type is greater than the far plane scene depth corresponding to the close view type.

For example, when the scene type of the input frame is a distant view type, the processor 130 may determine that the near plane scene depth and the far plane scene depth of the camera projection processing are divided into 5 meters and 100 meters. When the scene type of the input frame is a distant view type, the processor 130 may determine that the near plane scene depth and the far plane scene depth of the camera projection processing are divided into 1 meter and 20 meters. When the scene type of the input frame is a character close-up type, the processor 130 may determine that the near plane scene depth and the far plane scene depth of the camera projection processing are divided into 0.5 meters and 20 meters. However, the above numerical values are only exemplary and are not intended to limit the disclosure.

In some embodiments, the projection parameter of the camera projection processing may include the focus focal length of the camera intrinsic parameter. The focus focal length corresponding to the distant view type is greater than the focus focal length corresponding to the close view type, and the focus focal length corresponding to the distant view type is greater than the focus focal length corresponding to the character close-up type.

In some embodiments, when the scene type of the input frame is a character close-up scene, the processor 130 may recognize the target person in the input frame and obtain the image object size of the target person. According to the image object size of the target person, the processor 130 may determine the projection parameter of the camera projection processing. It can be seen from this that the projection parameter of the camera projection processing may change in response to changes in the image object size of the target person. The projection parameter of the camera projection processing includes a near plane scene depth, and the near plane scene depth is inversely related to the image object size. That is to say, the greater the image object size of the target person in the input frame, the smaller the near plane scene depth. The smaller the image object size of the target person in the input frame, the greater the near plane scene depth.

Figure 5:
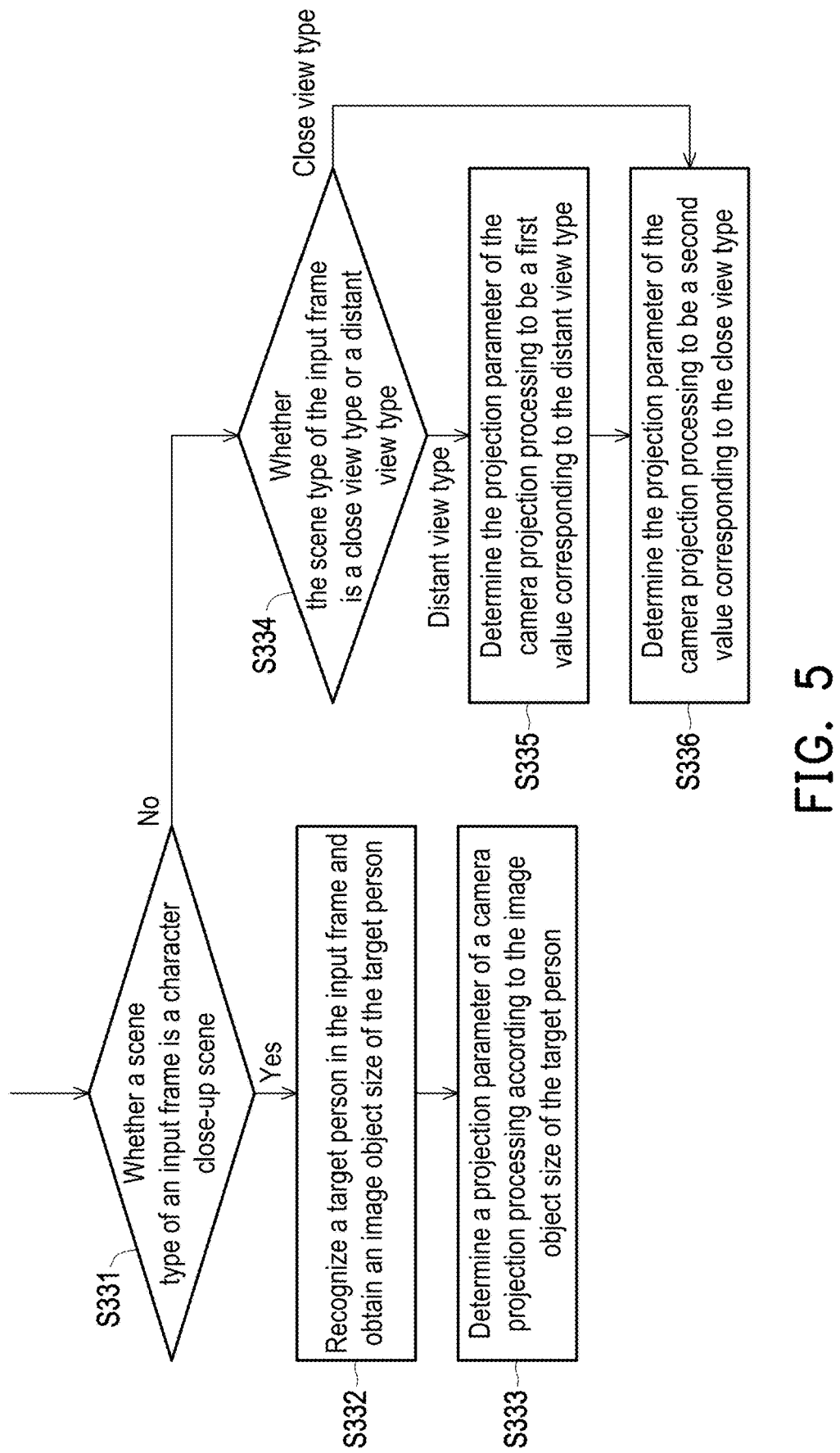
FIG. 5 is a schematic diagram of determining a projection parameter of a camera projection processing according to an embodiment of the disclosure.

FIG. 5 is a schematic diagram of determining a projection parameter of a camera projection processing according to an embodiment of the disclosure. Referring to FIG. 5, in some embodiments, step S330 may be implemented as step S331. In step S331, the processor 130 may determine whether the scene type of the input frame is a character close-up scene. If the determination in step S331 is yes, in step S332, the processor 130 may recognize the target person in the input frame and obtain the image object size of the target person. The processor 130 may use an object detection model, face detection technology, or other human body detection technology to detect the target person in the input frame. The object detection model is a trained convolution neural network model. In step S333, the processor 130 may determine the projection parameter of the camera projection processing according to the image object size of the target person. In some embodiments, the processor 130 may perform a table lookup based on the image object size of the target person to determine the projection parameter of the camera projection processing.

If the determination in step S331 is no, in step S334, the processor 130 may determine whether the scene type of the input frame is a close view type or a distant view type. In step S335, if the scene type of the input frame is a distant view type, the processor 130 may determine the projection parameter of the camera projection processing to be a first value corresponding to the distant view type. In step S336, if the scene type of the input frame is a close view type, the processor 130 may determine the projection parameter of the camera projection processing to be a second value corresponding to the close view type.

Returning to FIG. 3, then, in step S340, the processor 130 may project a plurality of pixels in the input frame to a stereoscopic coordinate system according to the projection parameter and the depth information to obtain a plurality of scene stereoscopic coordinates in the stereoscopic coordinate system. In some embodiments, the processor 130 may obtain the normalized depth value of each pixel according to the depth information of the input frame. The processor 130 may generate an adjusted depth value by adjusting the normalized depth value of each pixel based on the scene depth range in the projection parameter. Based on the camera intrinsic parameter in the projection parameter and the adjusted depth value of each pixel, the processor 130 may project each pixel to the stereoscopic coordinate system to generate the plurality of scene stereoscopic coordinates respectively corresponding to the plurality of pixels.

Specifically, the processor 130 may project specific pixel points on the input frame to the stereoscopic coordinate system according to the following formulas (1) to (3). In some embodiments, the specific pixel points may be mesh nodes obtained from the 3D mesh of the input frame.

$$z' = z_{near} + (z_{far} - z_{near})z \qquad \text{Formula (1)}$$

$$x' = (x - c_x)\frac{z'}{f_x} \qquad \text{Formula (2)}$$

$$y' = (y - c_y)\frac{z'}{f_y} \qquad \text{Formula (3)}$$

Wherein, $z_{near}$ represents the near plane scene depth; $z_{far}$ represents the far plane scene depth; z represents the normalized depth value generated by monocular depth estimation; z' represents the adjusted depth value; $f_x$ and $f_y$ represent the focal length in the x-axis and y-axis directions on the image plane in the camera intrinsic parameter matrix; $c_x$ and $c_y$ represent the principle point coordinates on the image plane. The processor 130 may project the pixels (x,y) in the input frame to the scene stereoscopic coordinates (x', y', z') in the stereoscopic coordinate system according to formulas (1) to (3). In some embodiments, the processor 130 may determine the near plane scene depth $z_{near}$, the far plane scene depth $z_{far}$ and the focal lengths $f_x$ and $f_y$ in formulas (1) to (3) according to the scene type of the input frame.

In step S350, the processor 130 may generate a side-by-side image including a left-eye image and a right-eye image according to the plurality of scene stereoscopic coordinates. In detail, the processor 130 may project these scene stereoscopic coordinates to a two-dimensional image coordinate system according to the pinhole camera model of the left virtual camera corresponding to the left eye viewing angle to generate a left-eye image. That is, the processor 130 may project the plurality of scene stereoscopic coordinates to the two-dimensional image coordinate system according to the extrinsic parameter matrix and the intrinsic parameter matrix of the left virtual camera corresponding to the left eye to obtain the left-eye image. Similarly, the processor 130 may project the plurality of scene stereoscopic coordinates to the two-dimensional image coordinate system according to the extrinsic parameter matrix and intrinsic parameter matrix of the right virtual camera corresponding to the right eye to obtain the right-eye image. Therefore, by splicing the left-eye image and the right-eye image, the processor 130 may generate the side-by-side image.

It should be noted that since the processor 130 generates the plurality of scene stereoscopic coordinates based on adjusted depth values close to the actual scene conditions, the parallax information of the left-eye image and the right-eye image generated based on these scene stereoscopic coordinates may be closer to the actual scene conditions.

Afterwards, the processor 130 may use the stereoscopic display 110 to perform 3D display operation based on the side-by-side image. In some embodiments, the processor 130 may control the stereoscopic display 110 to operate in a stereoscopic display mode to display the side-by-side image including the left-eye image and the right-eye image. Specifically, when the stereoscopic display 110 is a naked-eye stereoscopic display, the processor 130 may perform image weaving processing on the side-by-side image to obtain a weaving image. The image weaving processing causes the pixels of the left-eye image and the pixels of the right-eye image of the side-by-side image to be alternately arranged in the weaving frame. Afterwards, when the stereoscopic display 110 operates in the stereoscopic display mode, the display panel 111 of the stereoscopic display 110 will display the weaving image, and the refraction function of the lens layer 112 of the stereoscopic display 110 is enabled, so that the viewer may experience the stereoscopic visual effect.

For example, in the operating scenario of the processor 130 executing the video conferencing software, the stereoscopic display 110 may sequentially convert a plurality of two-dimensional streaming images provided by the conference participants into a plurality of side-by-side images, so that the user may experience stereoscopic visual effect through the stereoscopic display 110. It can be seen that when the scene content of the two-dimensional streaming images changes, the depth of the scene perceived by the user will also change accordingly.

Figure 6:
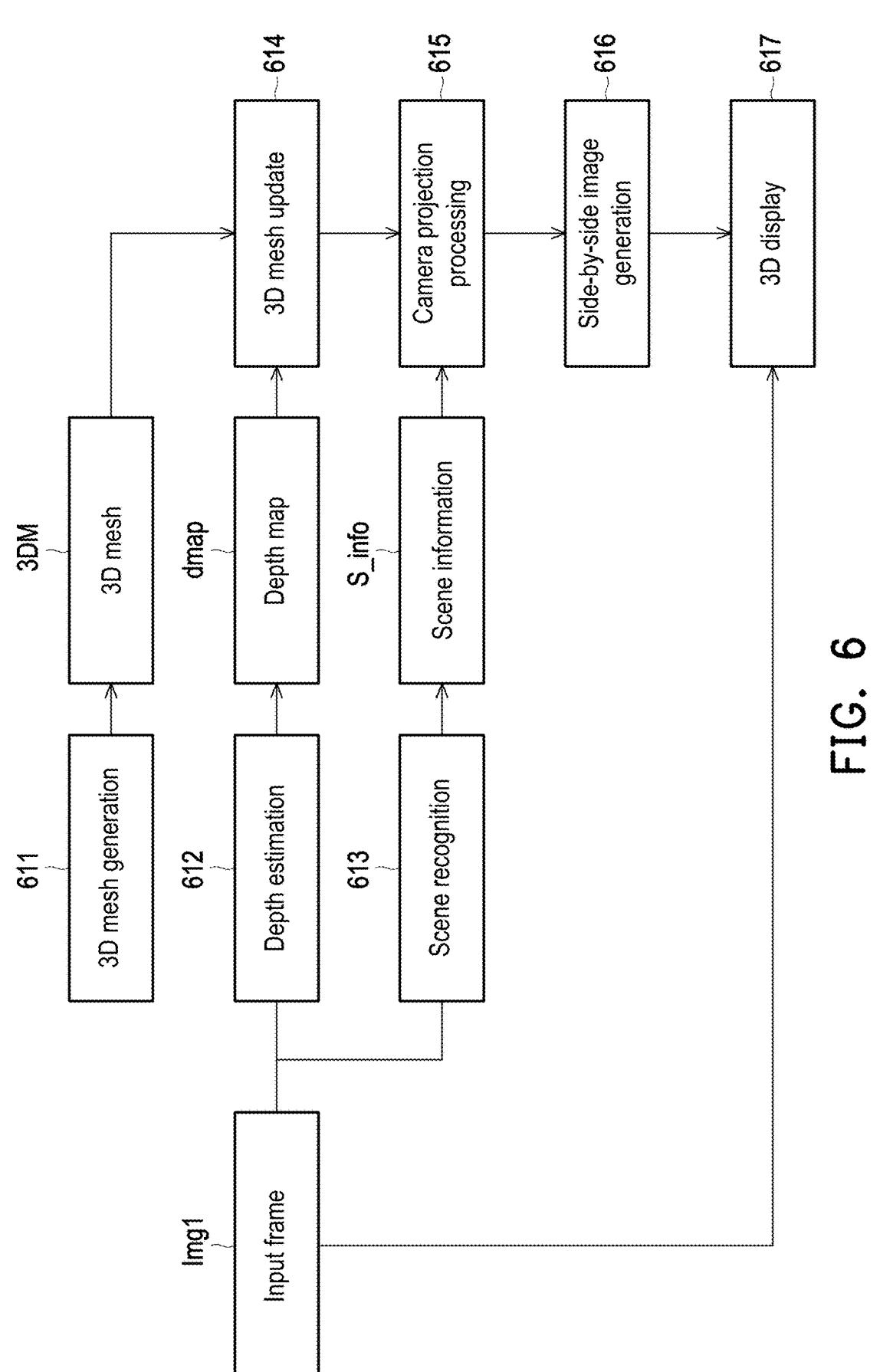
FIG. 6 is a schematic diagram of a stereoscopic image generation method according to an embodiment of the disclosure.

FIG. 6 is a schematic diagram of a stereoscopic image generation method according to an embodiment of the disclosure. Referring to FIG. 6, in operation 611, by performing 3D mesh generation in response to program initialization, the processor 130 may generate a 3D mesh 3DM. In operation 612, by performing depth estimation on the input frame Img1, the processor 130 may generate a depth map dmap of the input frame Img1. In operation 613, by performing scene recognition on the input frame Img1, the processor 130 may generate scene information S_info of the input frame Img1. The scene information S_info of the input frame Img1 may include the scene type of the input frame Img1 and the object information (such as the image object size) of the target object in the input frame Img1.

Afterwards, in operation 614, the processor 130 may use the normalized depth value in the depth map dmap to update the depth corresponding to each mesh node. The 3D mesh 3DM is updated to generate the updated 3D mesh of the input frame Img1. In operation 615, the processor 130 may determine the projection parameter of the camera projection processing according to the scene information S_info of the input frame Img1, and reference may be made to the description of the previous embodiment for the details thereof. Furthermore, according to the projection parameter of the camera projection processing, the processor 130 may back-project specific pixels corresponding to each mesh node to the stereoscopic coordinate system. Therefore, in operation 616, the processor 130 may generate the left-eye image and the right-eye image according to the plurality of scene stereoscopic coordinates in the stereoscopic coordinate system, and generate the side-by-side image according to the left-eye image and the right-eye image. Finally, in operation 617, the processor 130 may perform 3D display according to the side-by-side image through the stereoscopic display 110.

Figure 7:
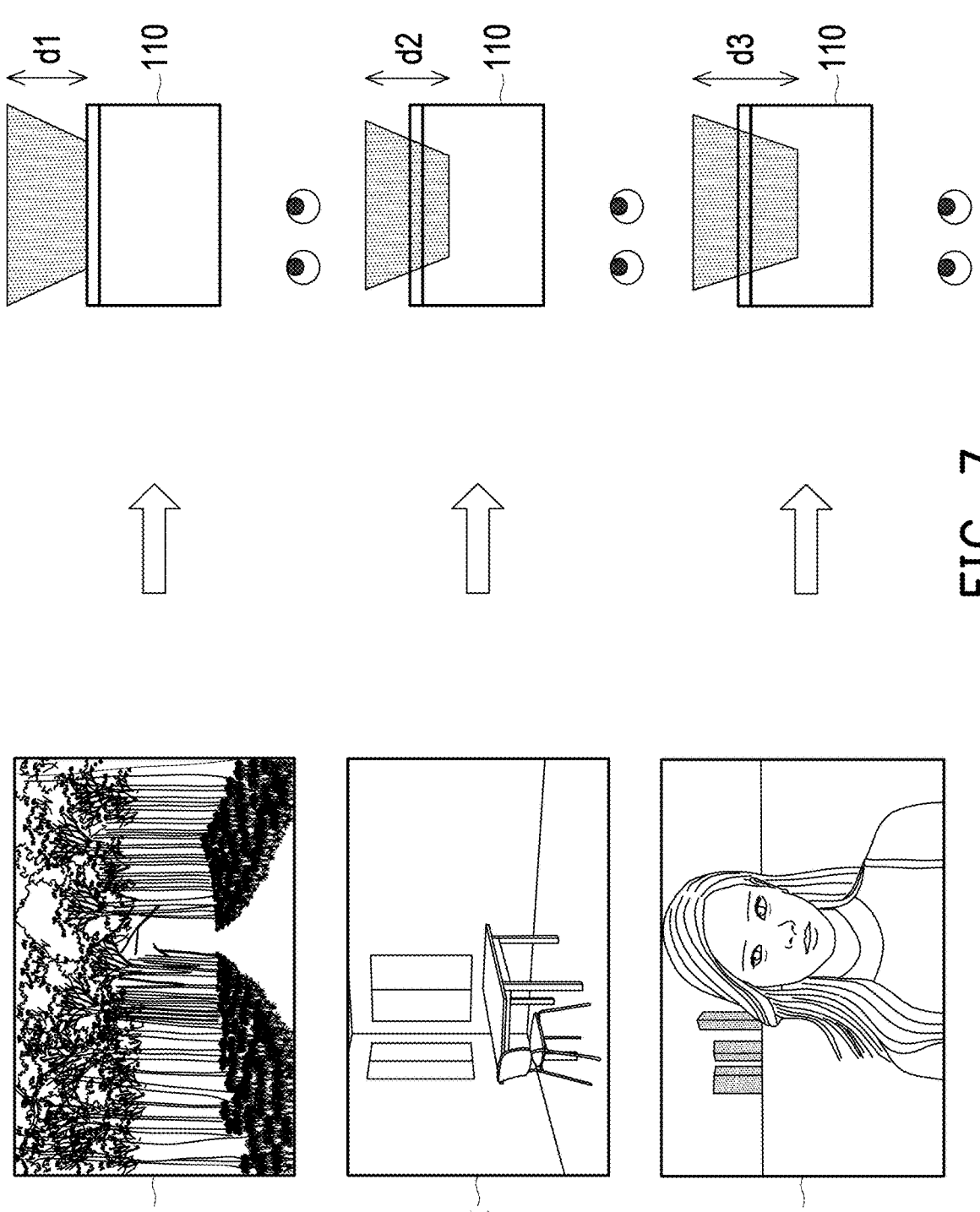
FIG. 7 is a schematic diagram of different scene depth ranges corresponding to different scene types according to an embodiment of the disclosure.

FIG. 7 is a schematic diagram of different scene depth ranges corresponding to different scene types according to an embodiment of the disclosure. Referring to FIG. 7, in some embodiments, the processor 130 may receive a video stream including a plurality of input frames Img71, Img72, and Img73. The processor 130 may respectively generate corresponding side-by-side images according to the input frames Img71, Img72, and Img73. In an operating scenario, the scene type of the input frame Img71 is an outdoor scene, and the processor 130 may determine a scene depth range d1 applied to the input frame Img71. The scene type of the input frame Img72 is an indoor scene, and the processor 130 may determine a scene depth range d2 applied to the input frame Img72. The scene type of the input frame Img73 is a character close-up scene, and the processor 130 may determine a scene depth range d3 applied to the input frame Img73. The near plane scene depth of the scene depth range d1 is greater than the near plane scene depth of the scene depth range d2 and the near plane scene depth of the scene depth range d3. The near plane scene depth of the scene depth range d3 is less than the near plane scene depth of the scene depth range d2.

To sum up, in the embodiment of the disclosure, the projection parameter of the camera projection processing may be determined according to the scene type of the input frame, and the plurality of pixels in the input frame are respectively projected to the plurality of scene stereoscopic coordinates in the stereoscopic coordinate system according to the projection parameter. Therefore, the side-by-side image including the left-eye image and the right-eye image may be generated based on the scene stereoscopic coordinates. Based on this, it ensures that the stereoscopic image content may be displayed correctly and may provide users with a new visual experience. In addition, in the embodiment of the disclosure, since the scene depth range and the focal length information in the projection parameter are determined based on the scene content of the input frame, the user's depth perception is closer to the real scene situation.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A stereoscopic image generation method, comprising:
    obtaining an input frame and depth information of the input frame;
    recognizing a scene type of the input frame;
    determining a projection parameter of a camera projection processing according to the scene type of the input frame;
    projecting a plurality of pixels in the input frame to a stereoscopic coordinate system to obtain a plurality of scene stereoscopic coordinates in the stereoscopic coordinate system according to the projection parameter and the depth information; and
    projecting the plurality of scene stereoscopic coordinates to 2D image coordinate systems to generate a left-eye image and a right-eye image and generating a side-by-side image by splicing the left-eye image and the right-eye image,
    wherein the step of the projecting the plurality of pixels in the input frame to the stereoscopic coordinate system to obtain the plurality of scene stereoscopic coordinates in the stereoscopic coordinate system according to the projection parameter and the depth information comprises:
    obtaining a normalized depth value of each of the plurality of pixels according to the depth information of the input frame;
    adjusting the normalized depth value of each of the plurality of pixels based on a scene depth range in the projection parameter to generate an adjusted depth value; and
    projecting each of the plurality of pixels to the stereoscopic coordinate system to generate the plurality of scene stereoscopic coordinates respectively corresponding to the plurality of pixels based on a camera intrinsic parameter in the projection parameter and the adjusted depth value of each of the plurality of pixels.

2. The stereoscopic image generation method according to claim 1, wherein the step of obtaining the input frame and the depth information of the input frame comprises: performing a monocular depth estimation on the input frame to obtain the depth information of the input frame.

3. The stereoscopic image generation method according to claim 1, wherein the step of recognizing the scene type of the input frame comprises: inputting the input frame to an image classification model; and determining the scene type of the input frame according to a classification result of the image classification model.

4. The stereoscopic image generation method according to claim 1, wherein the step of determining the projection parameter of the camera projection processing according to the scene type of the input frame comprises: when the scene type of the input frame is a first scene type, determining the projection parameter of the camera projection processing to be a first value corresponding to the first scene type; and when the scene type of the input frame is a second scene type, determining the projection parameter of the camera projection processing to be a second value corresponding to the second scene type.

5. The stereoscopic image generation method according to claim 4, wherein the first scene type is a distant view type, the second scene type is a close view type, and the projection parameter of the camera projection processing comprises a near plane scene depth and a far plane scene depth, wherein the near plane scene depth corresponding to the distant view type is greater than the near plane scene depth corresponding to the close view type, and the far plane scene depth corresponding to the distant view type is greater than the far plane scene depth corresponding to the close view type.

6. The stereoscopic image generation method according to claim 1, wherein the projection parameter of the camera projection processing comprises a cameraintrinsic parameter, a scene depth range, or a combination thereof.

7. The stereoscopic image generation method according to claim 1, wherein the step of determining the projection parameter of the camera projection processing according to the scene type of the input frame comprises: when the scene type of the input frame is a character close-up scene, recognizing a target person in the input frame and obtaining an image object size of the target person; and determining the projection parameter of the camera projection processing according to the image object size of the target person.

8. The stereoscopic image generation method according to claim 7, wherein the projection parameter of the camera projection processing comprises a near plane scene depth, and the near plane scene depth is inversely related to the image object size.

9. The stereoscopic image generation method according to claim 1, further comprising: performing a 3D display operation using a stereoscopic display based on the side-by-side image.

10. A stereoscopic image display system, comprising:
a stereoscopic display; and
at least one processor, coupled to the stereoscopic display, and configured to:
  obtain an input frame and depth information of the input frame;
  recognize a scene type of the input frame;
  determine a projection parameter of a camera projection processing according to the scene type of the input frame;
  project a plurality of pixels in the input frame to a stereoscopic coordinate system to obtain a plurality of scene stereoscopic coordinates in the stereoscopic coordinate system according to the projection parameter and the depth information; and
  project the plurality of scene stereoscopic coordinates to 2D image coordinate systems to generate a left-eye image and a right-eye image and generate a side-by-side image by splicing the left-eye image and the right-eye image,
wherein the processor is further configured to:
obtain a normalized depth value of each of the plurality of pixels according to the depth information of the input frame;
adjust the normalized depth value of each of the plurality of pixels based on a scene depth range in the projection parameter to generate an adjusted depth value; and
project each of the plurality of pixels to the stereoscopic coordinate system to generate the plurality of scene stereoscopic coordinates respectively corresponding to the plurality of pixels based on a camera intrinsic parameter in the projection parameter and the adjusted depth value of each of the plurality of pixels.

* * * * *